(12) United States Patent
Le Cocq et al.

(10) Patent No.: US 7,743,962 B2
(45) Date of Patent: Jun. 29, 2010

(54) METHOD FOR MAKING A CLOSED CONTAINER, SAID CLOSED CONTAINER AND ITS COMPONENTS

(75) Inventors: Serge Le Cocq, Montigny le Bretonneux (FR); Christophe Henault, Paris (FR); Pierre-Yves Gatt, Saint Symphorien sous Chomerac (FR)

(73) Assignee: Areva NC, Paris (FR)

( * ) Notice: Subject to any disclaimer, the term of this patent is extended or adjusted under 35 U.S.C. 154(b) by 410 days.

(21) Appl. No.: 10/539,864

(22) PCT Filed: Dec. 17, 2003

(86) PCT No.: PCT/FR03/03762
§ 371 (c)(1),
(2), (4) Date: Oct. 19, 2005

(87) PCT Pub. No.: WO2004/066312
PCT Pub. Date: Aug. 5, 2004

(65) Prior Publication Data
US 2006/0118603 A1    Jun. 8, 2006

(30) Foreign Application Priority Data
Dec. 20, 2002   (FR) ................................. 02 16295

(51) Int. Cl.
*B23K 31/02*   (2006.01)
(52) U.S. Cl. ................. 228/124.6; 228/124.7; 220/612; 220/678; 219/76.16; 219/121.36
(58) Field of Classification Search .............. 250/506.1, 250/507.1, 515.1; 277/584, 611, 638; 206/303; 220/612, 678; 228/124.6, 124.7
See application file for complete search history.

(56) References Cited

U.S. PATENT DOCUMENTS

| 3,890,482 | A | | 6/1975 | DiBenedetto |
| 4,673,814 | A | * | 6/1987 | Schroeder et al. ......... 250/506.1 |
| 4,738,388 | A | * | 4/1988 | Bienek et al. ............... 228/135 |
| 4,831,233 | A | * | 5/1989 | Gordon .................. 219/124.34 |
| 5,346,096 | A | | 9/1994 | Diersch et al. |
| 5,733,088 | A | | 3/1998 | Kerrien et al. |
| 2002/0050480 | A1 | * | 5/2002 | Rolle ........................... 215/49 |

FOREIGN PATENT DOCUMENTS

| EP | 0 774 761 A1 | 5/1997 |
| GB | 664 410 | 1/1952 |

\* cited by examiner

*Primary Examiner*—Kiley Stoner
*Assistant Examiner*—Erin B Saad
(74) *Attorney, Agent, or Firm*—Cohen Pontani Lieberman & Pavane LLP

(57) ABSTRACT

A closed container with a tight and mechanically strong seal having two fastened-together metal elements including a body and a cover. The body is essentially a cylindrical or prismatic shape having a base with one or more axial walls and an open top axial end. The cover has a more or less complex shape having one or more walls to be positioned at the top axial end of the body facing the axial wall(s) of the body. The fastening of the metal elements is via a butt weld, advantageously with no filler metal. The internal structure at the weld line includes a docking guide having a groove provided with at least one degassing chimney, and a chamfered end above or below the weld line, on the wall. The body and/or the cover include(s) at least one blanked off degassing vent.

7 Claims, 3 Drawing Sheets

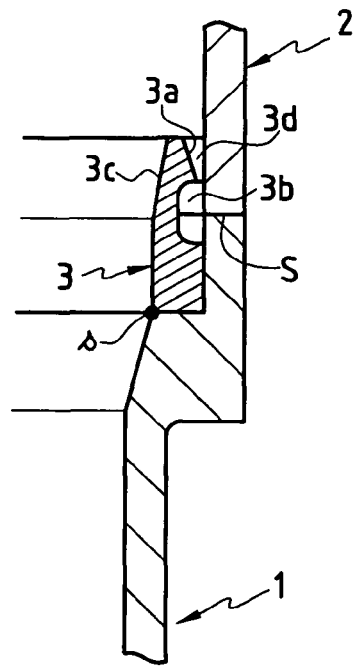 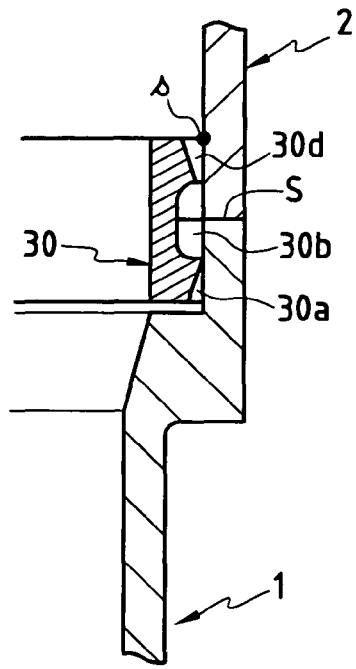 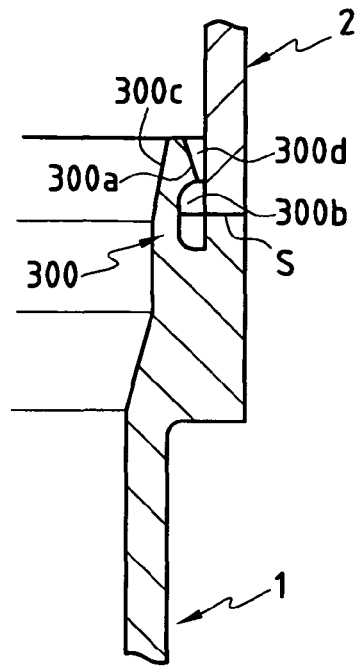
FIG.2A     FIG.2B     FIG.2C
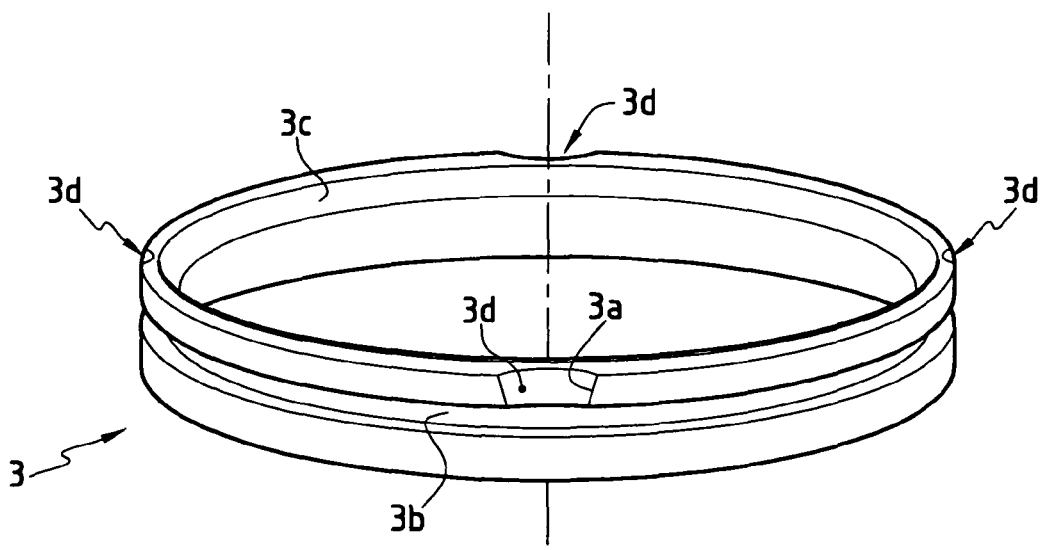
FIG.3

METHOD FOR MAKING A CLOSED CONTAINER, SAID CLOSED CONTAINER AND ITS COMPONENTS

PRIORITY CLAIM

This is a U.S. national stage of application No. PCT/FR2003/003762, filed on 17 Dec. 2003. Priority is claimed on the following application: Country: France, Application No.: 02 16295, filed 20 Dec. 2002; the content of which is incorporated here by reference.

BACKGROUND OF THE INVENTION

The present invention relates to producing a closed container, to said closed container, and to its constituent elements. More precisely, the present invention relates:
to a method of producing a closed container with a tight and mechanically strong seal by fastening two metal elements of the following type:
a) a body with an essentially cylindrical or prismatic shape having a base with one or more axial walls and an open top axial end; and
b) a cover the shape of which may be more or less complex, having one or more walls to be positioned at the top axial end of said body facing the axial wall(s) of said body in the extension thereof;
which method is carried out under particular and difficult conditions;
to said closed container with a tight and mechanically strong seal having a structure which comprises the two metal elements defined above (body, cover) fastened to each other; and
to the constituent elements of said container, considered independently and jointly, prior to said fastening, i.e.:
a) said body;
b) said cover; the internal structure of one of said two elements including a docking guide; and
c) said docking guide per se, when used as an insert.

The present invention was developed in the context of packaging and storing nuclear waste, more precisely in the context of the invention described and claimed in European patent EP-A-0 774 761. However, the present invention is not limited to that context.

More generally, the present invention pertains to the field of packaging hazardous waste which is handled remotely, most probably with a view to storage. The body of a container, loaded with said hazardous waste (for example nuclear waste compressed into cake), open at is top axial end (and not solely with a single small diameter orifice) has to be blanked off with a cover. Said blanking off must be tight (because of the hazardous nature of said waste) and mechanically strong (the loaded closed container subsequently has to be handled by its cover). It must also be capable of being carried out in a hostile environment (primarily a nuclear environment) in an automated manner under remote control.

In the context of packaging nuclear waste in bulk in containers, said waste being bound with a binder of the glass or cement type, the filling orifices of said containers (small diameter orifices) are blanked off by positioning and welding a plate thereto. The diameter of said filling orifices is not large and the weld in question does not have to be very strong, although that weld must provide a seal. The blanking off technique employed in that context (less severe specifications) cannot directly be transposed to the context of the invention (where the specifications are particularly severe). A large surface area has to be blanked off and the seal in question must be mechanically strong.

In said context of the invention, it was initially envisaged that a conventional mechanical sealing method could be employed, involving the combined use of parts in the form of a flange, bolts, and gaskets. Such a method involves much handling and problems with ageing of the gaskets in question are unavoidable.

SUMMARY OF THE INVENTION

The method of the invention was thus conceived which, in characteristic manner, comprises two steps: a first step of docking the two metal elements to be welded and a second welding step carried out under particular conditions.

In a first aspect, the present invention thus provides a method of producing a closed container with a tight and mechanically strong seal by fastening two metal elements of the following type:
a) a body with an essentially cylindrical or prismatic shape having a base with one or more axial walls and an open top axial end; and
b) a cover the shape of which may be more or less complex, having one or more walls to be positioned at the top axial end of said body facing the axial wall(s) of said body in the extension thereof.

The body in question, advantageously essentially cylindrical in shape, is generally loaded. The aim is to package the load inside the closed container. The cover is positioned with its axial wall(s) in the extension of the axial walls(s) of the body.

Characteristically, the method of producing the closed container of the invention is carried out in a hostile environment, in an automated manner, under remote control (because of the hazardous nature of the load in question) and it comprises the following two steps in succession:
docking said two metal elements so that the facing ends of their walls are maintained in contact;
producing a continuous penetrative weld over the entire periphery of said two metal elements at their wall ends which are maintained in contact.

During the first of said steps, said two metal elements to be fastened (body and cover) are moved close together and then brought into abutting contact in a stable manner.

During the second of said steps, a weld is produced at the contacting ends of said two metal elements (body and cover). Said weld is of a particular type. It is produced over surfaces which are maintained in contact without overlapping. It is continuous so that the required seal is obtained. It is penetrative, i.e. produced over the whole thickness of the walls in question, so that the required mechanical strength is obtained.

These two successive steps of the method of the invention can be carried out at the same station or at different stations.

In a variation:—a loaded container is brought to a single station. At this single station, said loaded container is capped with a suitable cover and the weld is produced;

In a further variation:—said loaded container is capped with said cover at a first station and the weld is produced at a second station. This further variation is illustrated below in the present text in a particular context.

Bringing the two elements for welding close together during the first docking step is advantageously performed by a guided approach carried out with the aid of a docking guide arranged in the internal structure of one or the other of said two elements for welding. The scope of the method of the invention does not exclude such a guided approach involving means external to the structure of said two metal elements in question (body and cover). This, however, is more difficult to implement.

To produce the weld, all spot welding operations are advantageously avoided. It is recommended that the ends of the walls of both of the elements for fastening should be maintained in contact by exerting a force on one of said elements, the other obviously being rendered immobile. Advantageously, such a force is exerted on the cover, the body being kept completely stationary.

Welding may be carried out with or without a filler metal. Using a filler metal may at first sight seem to make welding simpler, but in fact it is more complicated in the particular context of the invention because of the operational constraints (hostile environment, remote control, etc).

In an advantageous variation, the welding carried out during the second step of the method of the invention employs no filler metal.

The welding carried out with or without a filler metal, advantageously without a filler metal (see above), may be implemented using a variety of techniques which are familiar to the skilled person, and in particular a laser technique or an electric arc technique with a refractory electrode (plasma or tungsten inert gas (TIG)).

Open jet plasma process welding is particularly recommended, with melt-bath back cover and limiting the internal overpressure. The principle of the open jet plasma process welding (also known as keyhole welding) is familiar to the skilled person. In the context of the present invention, such a welding technique is advantageously employed with protection of the melt-bath (generally by inerting with argon to prevent any oxidation) and controlling the overpressure generated in the container (because of the introduction of the plasma jet into said container).

In particularly preferred manner, this welding technique is carried out in a container comprising a docking guide in its internal structure; said docking guide is employed during said welding as well as when docking the two elements for welding. Said docking guide is used during said welding to receive and guide the open jet. In the context of this particularly preferred variation, the open jet opens into a groove provided with at least one degassing chimney machined in said docking guide arranged in the internal structure of the body or cover of the container. The gas evacuated from said groove via said degassing chimneys does not accumulate inside the container. Advantageously, at least one degassing vent is provided in the structure of said container in the body and/or the cover of said container, advantageously in the cover. Said degassing vent may be closed once welding is complete.

In the context of this particularly preferred variation of the method of the invention, the following are carried out in succession:
  the docking step;
  the welding step; using the docking guide during said two steps; and
  a third step of completely blanking off the container obtained by welding its body and its cover; the third step blanks off the degassing vent(s) used during said welding step.

The welding carried out using any welding technique and more particularly using the open jet plasma process is advantageously carried out in accordance with one and/or the other of the following variations:
  along a horizontal welding axis on the vertical container (body+cover); and/or
  with the fixed container and a welding head being rotated around said container, at the level of the ends of the walls of the body and the cover for said container, which are maintained in contact.

The method of the invention as described above in general terms and below with reference to the accompanying drawings is advantageously carried out to produce a closed container for confined packaging and storage of hazardous waste, in particular nuclear waste (more particularly nuclear waste which has been compacted into cake).

In a second aspect, the present invention provides the containers that can be obtained after carrying out the method forming the first aspect of said invention as defined above. The structure of said containers bears the signature of said method. Such containers are closed with a tight and mechanically strong seal. Their structure comprises, fastened one to the other, two metal elements of the type already defined above:
  a) a body with an essentially cylindrical or prismatic shape having a base with one or more axial walls and an open top axial end; and
  b) a cover the shape of which may be more or less complex, having one or more walls to be positioned at the top axial end of said body facing the axial wall(s) of said body in the extension thereof.

The body of such a container is advantageously essentially cylindrical in shape. It is generally loaded with elements packaged into said container.

In characteristic manner:
  the fastening of the body and the cover is of the butt weld type, advantageously with no filler metal;
  the internal structure of said containers includes a docking guide at the weld line (in the plane of the join between said body and cover), which docking guide has:
    at said weld line, on the wall side, a groove provided with at least one degassing chimney;
    a chamfered end above or below, preferably above said weld line, on the wall side;
  the body and/or the cover, advantageously the cover of said containers, includes(s) at least one blanked off degassing vent.

The above characteristics of the containers can be perfectly understood following consideration of the above description of the method. Their external structure includes the weld between the body and the cover and at least one blanked off degassing vent; their internal structure includes the docking guide at said weld. It is arranged at a suitable level:
  so that its groove faces the weld line (it must be able to receive the plasma jet when carrying out plasma welding); and:
  so that its chamfered end can participate in docking.

It is arranged in the internal structure of the cover or body of the container. In general, the docking guide is:
  either machined in the bulk of the body or the cover of said container, advantageously machined in the bulk of said body of said container;
  or, as an insert, spot welded to said body or to said cover.

In a third aspect, the present invention provides the constituent elements of the containers of the invention as defined above, the constituent elements being considered independently and jointly (provided that they are subsequently to be welded together) prior to fastening by welding. Said elements consist of:
  said container body the internal structure of which, in characteristic manner, includes a docking guide which can be used during docking and during welding of the body associated with a cover by welding in conventional manner; or:

said container body, which is conventional, is associated with a cover by welding, the internal structure of which in characteristic manner includes a docking guide that may be used during docking and during welding; or:

said docking guide per se, which may be used as an insert in the internal structure of a body or a cover of a container of the invention.

In a third aspect, then, the present invention provides one or more elements of the type comprising:

a) a body with an essentially cylindrical or prismatic shape having a base, one or more axial walls and open at is top axial end; or (and)

b) a cover with a more or less complex shape having one or more walls intended for being disposed at the top axial end of said body, facing said axial wall(s) of said body in the extension thereof;

said elements of type a) and b) being intended to be fastened to each other to constitute a closed container with a tight and mechanically strong seal. In characteristic manner, the internal structure of one of said elements (body or cover) includes, over its entire periphery, fastened beyond the end(s) of its wall(s) intended to be fastened to the end(s) of the wall(s) of the other element (cover or body) and extending beyond said end, a docking guide which has:

beyond said end—on the wall side—a chamfered end which, during docking, can guide and position the other element (cover or body); and at said end—also on the wall side—at which welding will be carried out, a groove provided with at least one degassing chimney, which can evacuate the overpressure generated to the inside of the container;

one and/or the other of said elements (body and/or cover), advantageously the cover, having at least one degassing vent accessible to the gas evacuated from said groove of said docking guide via said degassing chimney during welding and suitable for being blanked off when the weld is complete.

Characteristically, one and/or the other of the constituent elements—the body and cover—of the container has means useful for implementing fastening by welding. These are principally the docking guide, an essential constituent element, and at least one degassing vent.

Said docking guide is generally as indicated above:
either machined in the bulk of the body or the cover; advantageously machined in the bulk of said body;
or, as an insert, spot welded to said body or said cover.

When fastened to said body or cover, it is considered to be an independent constituent element of the container to be closed in accordance with the invention (open container).

Said docking guide, an insert, constitutes an integral part of the third aspect of the invention. It is a metal part intended to be attached, by welding (generally spot welded) to the circumference of the internal structure of the body or the cover of a metal container at a position at which said body or said cover has an essentially cylindrical or prismatic shape and at which said body and cover are intended to be fastened by a weld. Characteristically, the outer periphery of the structure of said part, which is of a suitable shape, has the following:

a groove provided with at least one degassing chimney; and
a chamfered end.

The shape of said part is clearly adapted to the shape of the internal structure of the body or the cover on which it is intended to be used. It is advantageously essentially cylindrical, to be used on the essentially cylindrical wall of a body or a cover. Its outer periphery has means which allow it to carry out its two functions:

the chamfered end is intended to guide and position one of said elements (cover or body) onto the other element (body or cover); and:
the groove, is provided with at least one degassing chimney, which can receive the plasma jet and direct the gas to the interior of the container.

BRIEF DESCRIPTION OF THE DRAWINGS

The method and device aspects of the invention are illustrated below in a particular context with reference to the accompanying figures. This illustration is not in any way limiting, neither as regards the context nor as regards the drawings.

FIG. 2A is an enlarged view of the body/cover weld zone of said container of FIG. 2, which weld zone shows the characteristic docking guide.

FIGS. 2B and 2C are similar views of variations of the docking guide.

FIG. 3 is a perspective view of a docking guide of the invention for use as an insert.

DETAILED DESCRIPTION OF THE PRESENTLY PREFERRED EMBODIMENTS

Figure 1:
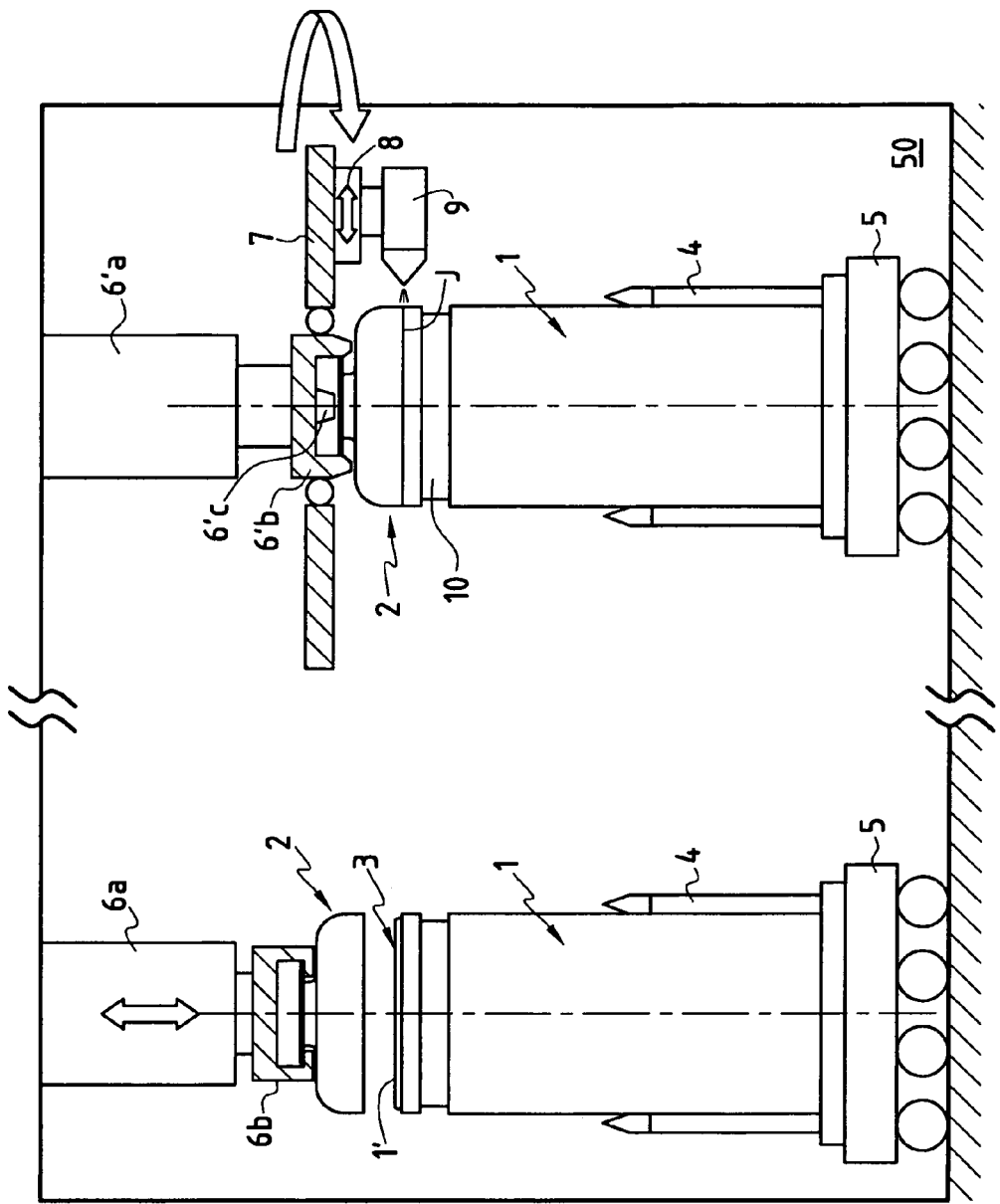
FIGS. 1A, 1B, 1C show steps in a method of packaging nuclear waste, which packaging method includes producing a closed container of the invention.

FIG. 1A shows an empty container 1+2 constituted by a cylindrical body 1 which is open at its top axial end 1' (visible in FIG. 1B) and a cover 2 blanking off said top axial end 1'. Said container 1+2 is disposed on a transfer trolley 5 which is movable in translation. It is stabilized on said trolley 5 by means of posts 4.

The upper part of the body 1 of the container 1+2 has a shoulder 10, thus forming a gripping flange used to handle said body 1.

The cover 2 of the container 1+2 has the shape of a dome 22 and its upper portion has a dome head 20. In similar manner, said dome head 20 constitutes a gripping means for handling said cover 2. A degassing vent, not shown (because of the scale) is located on said cover 2, more precisely on the dome head 20.

Said cover 2 has been positioned and is temporarily stabilized on the body 1 by means of the docking guide 3 (visible in FIG. 1B)) arranged on the upper inner portion of said body 1 at its top axial end 1' (visible in FIG. 1B).

The pre-constituted container thus formed, and temporarily closed in a non sealed manner, is intended to be introduced into an active chamber 50 (FIGS. 1B and 1C) for filling with nuclear waste and blanking off with a closure which is sealed and mechanically strong.

FIG. 1B shows the step of removing (taking off) the cover 2, which gives access to the interior of the body 1 of the container 1+2. This removal of the cover 2 involves the use of the gripping means 6b for gripping said cover 2, controlled by a hoist 6a which can move up and down.

Said gripping means 6b hold said cover 2 while the body 1 is moved in translation to a filling station (not shown). Once filled, the body 1 returns beneath the hoist 6a and is once again fitted with the cover 2. The docking guide 3 is used here to dock the two elements, the filled body and cover (in other words it is used for guiding and positioning said cover on said filled body 1) and for stabilizing said cover 2 in contact with said body 1. Docking is thus carried out without spot welding.

The filled container, provisionally closed in a non sealed manner, is then moved in translation to the welding station. At said welding station FIG. 1C—another hoist 6'*a* is used, provided with the welding machine with its centering device 6'*b* for centering on the dome head 20 of the cover 2.

Welding is carried out in the horizontal butt weld position. The container 1+2 is fixed and the welding head 9 (plasma torch) turns about the joint to be welded 1 (contact zone between body 1 and cover 2). To position correctly the elements 1 and 2 for welding (edge to edge, i.e. butting, no separation, no chamfer), the hoist 6'*a* descends so that the means 6'*b* come to bear against the dome head 20 of the cover 2. A ball and socket system (not shown) can detect differences in position of the container 1+2 on the trolley 5 and ensure accurate centering. The bearing force is non negligible. It allows to hold the cover 2 in position without clearance and thus avoids any need of spot welding prior to welding.

To overcome the problem of variable separations between the electrode and the weld joint J, the welding head 9 is mounted on a motor-driven slide rail 8 which is automatically controlled by adjusting the AVC (arc voltage control); the slide rail 8 is mounted beneath an orbital plate 7.

Once the weld has been produced in at least one pass of torch 9, means 6'*c* (for example a TIG torch) are used to blank off the degassing vent (not shown) provided in the dome head 20 of the cover 2. The presence of at least one such vent is vital to limit any internal overpressure in the container 1+2 during welding.

Docking of the cover 2 to the body 1 can be carried out without any spot welding using the docking guide (ring) 3. Said guide 3 also allows a continuous, penetrative weld to be produced over the entire circumference of the docked elements 2 and 1. The presence of a groove (see FIGS. 2, 2A, 2B, 2C and 3 below) in the structure of said guide 3 provides back protection of the weld and provides a run-off for the plasma jet.

The loaded container obtained following welding is thus closed and blanked off in sealed manner. The seal is also mechanically strong. Said loaded closed container can be handled via the dome head 20 of its cover 2.

Figure 2:
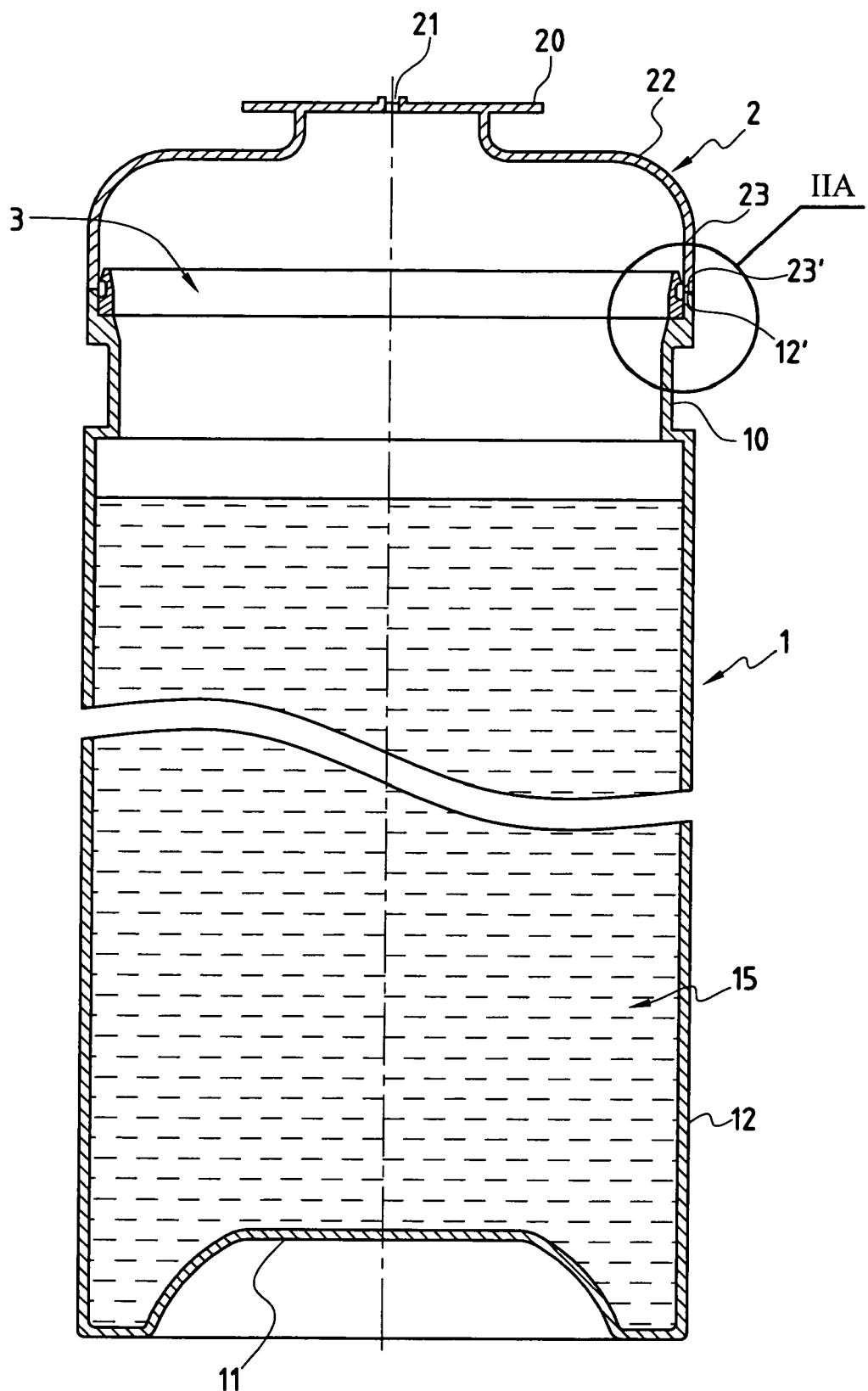
FIG. 2 is a cross section of said closed container of the invention prior to blanking off the degassing vent arranged on its cover.

FIG. 2 shows a loaded, closed container 1+2 of the invention prior to blanking off the degassing vent 21 arranged in the dome head 20 of its cover 2. Said degassing vent 21 can be plugged by welding using the TIG method mentioned above with no filler metal. The structure of said vent 21 is such that a sufficient reserve of material is provided.

FIG. 2 shows:
at 1, the body of the container 1+2. Said body 1 is essentially cylindrical. It has a base 11 and an axial wall 12. The top portion of said axial wall 12 has a shoulder 10 and, beyond said shoulder 10, its top end 12'. Welding has been carried out at said top end 12';
at 2, the cover of the container 1+2. Said cover comprises a dome 22 surmounted by a dome head 20. Reference numeral 23' indicates the bottom end of said dome 22 (more precisely, the bottom end of the vertical wall 23 of said dome 22) welded to the end 12' of the axial wall 12 of the body 1; reference numeral 21 indicates the degassing vent, not yet blanked off;
at 15, waste packaged in the container 1+2;
at 3, the docking guide, an essential element for centering and positioning the cover 2 on the body 1 then welding the cover 2 to the body 1.

Said docking guide 3 is described in more detail with reference to FIG. 2A. In FIG. 2A, it can clearly be seen that the weld S produced is a butt weld (end 12' of the wall 12 of the body 1 to end 23' of the vertical wall 23 of the dome 22 of the cover 2) with no filler metal. The docking guide 3, shown in FIGS. 1B, 2 and 2A, is an insert (as shown in perspective in FIG. 3), spot welded at <u>s</u> to the internal structure of the top portion of the axial wall 12 of the body 1. It is welded in one direction at a suitable level so that:

its top chamfered end 3*a* is located, on the wall side, beyond the plane of the weld S and thus has contributed to guiding and positioning the cover 2 when docking with the body 1;

its groove 3*b* on the wall side is located in the plane of the weld S and thus, during welding, receives the plasma jet and provides back protection of the weld. Said groove 3*b* is provided with at least one degassing chimney 3*d*. In fact, it has four said degassing chimneys 3*d* (see FIG. 3). The overpressure generated in said groove 3 during welding is successively evacuated via said degassing chimneys 3*d* and the degassing vent 21 (FIG. 2).

The docking guide 3 also has its chamfered top end 3*c* on the inside of the container. Advantageously, an inner cover is provided which optimizes confinement of the waste 15 in the container 1+2.

The docking guide also serves as a screen during welding. It protects the waste 15, in particular from the heat developed by the plasma jet.

FIG. 2B shows a docking guide 30 of the same type, namely an insert, but said insert has been fastened by welding s, not to the body 1 of the container 1+2 but to its cover 2. Said docking guide 30 has:

its lower chamfered end 30*a*, on the wall side, below the plane of the weld S. The dimensions of said end are such that it can exert its guiding and positioning action on the cover 2 prior to welding;

its groove 30*b*, on the wall side, in the plane of the weld S, provided with at least one degassing chimney 30*d*.

Said docking guide 30 is not configured to receive an intermediate cover.

In FIG. 2C, the docking guide 300 is not an insert. It is machined into the bulk of the body 1. Its shape is entirely similar to that of the guide 3 (in FIG. 2A). The following are present:

300*a*, its chamfered top end for docking the cover 2 on the body 1;

300*b*, its groove for welding;

300*d*, a degassing chimney;

300*c*, its chamfered top end, on the inside, for receiving and stabilizing an internal cover.

As described above, FIG. 3 is a perspective view of the docking guide (ring) 3 of FIGS. 1B, 2 and 2A.

The invention claimed is:

1. A method of producing a closed container with a tight and mechanically strong seal by fastening together:
   a metal body having an axis with a shape that is one of cylindrical and prismatic, said body having a base with at least one axial wall parallel to said axis and an open top axial end; and
   a metal cover having an axis coaxial with said axis of said body and at least one end wall parallel to said axis, said end wall of said cover to be positioned at said top axial end of said body facing said at least one axial wall of said body;
   wherein at least one of said body and said cover includes a docking guide having a groove therein, said groove including a degassing chimney;

wherein at least one of said body and said cover includes a degassing vent; and wherein the method comprises the following steps, carried out in a hostile environment in an automated manner, under remote control;

docking said body and said cover so that said axial wall of said body in the vicinity of said open top thereof and said end wall of said cover face each other and are maintained in contact, said docking being performed by guiding said cover and body together by said docking guide;

producing a continuous penetrative weld over the entire periphery of said cover and said body at the ends of their respective walls which are maintained in contact, said weld being produced by open jet plasma with melt-bath back cover, wherein said open jet opens into said groove;

limiting the internal overpressure in the container produced; and blanking off said degassing vent after said weld has been produced.

2. The method of claim 1, wherein said weld is produced without spot welding, and further comprising the step of exerting a force on at least one of the ends of the walls of said body and said cover to thereby maintain said body and said cover in contact during welding.

3. The method of claim 1, wherein said weld is produced without a filler metal.

4. The method of claim 1, wherein said weld is produced with the container substantially in the vertical position, with the weld axis substantially horizontal.

5. The method of claim 4, wherein said weld is produced with the container being fixed and with a welding head which is rotated around said container at the level of the ends of the walls maintained in contact.

6. The method of claim 1, wherein the method is carried out to produce a closed container for confined packaging and storage of hazardous waste.

7. The method of claim 1, wherein said hazardous waste is nuclear waste.

* * * * *